US006426954B1

(12) United States Patent
Krause

(10) Patent No.: US 6,426,954 B1
(45) Date of Patent: *Jul. 30, 2002

(54) PROTOCOL FOR OPTIMIZED MULTICAST SERVICES FOR A CONNECTION ORIENTED NETWORK PROVIDING LAN EMULATION

(75) Inventor: Jeffrey Krause, Los Altos, CA (US)

(73) Assignee: 3Com Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/389,657

(22) Filed: Sep. 2, 1999

Related U.S. Application Data

(63) Continuation of application No. 08/502,871, filed on Jul. 14, 1995, now Pat. No. 6,005,864.

(51) Int. Cl.[7] .............................................. H04L 12/56
(52) U.S. Cl. .................................................. 370/395.53
(58) Field of Search ................................ 370/395, 405, 370/389, 351, 352, 356, 360, 375, 390, 392, 393, 394, 396, 397, 398, 399, 400, 401, 409, 445, 447, 449, 461, 462, 466, 469, 471, 473, 475, 395.2, 395.21, 395.31, 395.53, 395.4, 395.6; 340/825.5, 825.08, 825.51

(56) References Cited

U.S. PATENT DOCUMENTS

| | | | |
|---|---|---|---|
| 4,823,338 A | 4/1989 | Chan et al. | 370/85 |
| 4,975,906 A | 12/1990 | Takiyasu et al. | 370/85.13 |
| 5,214,646 A | 5/1993 | Yacoby | 370/85.14 |
| 5,280,476 A | 1/1994 | Kojima et al. | 370/60.1 |
| 5,280,481 A | 1/1994 | Chang et al. | 370/85.13 |
| 5,315,582 A | 5/1994 | Morizono et al. | 370/16 |
| 5,321,694 A | 6/1994 | Chang et al. | 370/85.13 |
| 5,329,527 A | 7/1994 | Ujihashi et al. | 370/85.13 |
| 5,345,558 A | 9/1994 | Opher et al. | 395/200 |
| 5,390,184 A | 2/1995 | Morris | 370/94.2 |
| 5,394,402 A | 2/1995 | Ross | 370/94.1 |
| 5,408,469 A | 4/1995 | Opher et al. | 370/60.1 |
| 5,444,702 A | 8/1995 | Burnett et al. | 370/60.1 |
| 5,530,703 A * | 6/1996 | Liu et al. | 371/255 |
| 5,734,865 A * | 3/1998 | Yu | 370/254 |
| 5,752,003 A * | 5/1998 | Hart | 395/500 |
| 6,005,864 A * | 12/1999 | Krause | 370/465 |
| 6,041,166 A * | 3/2000 | Hart et al. | 395/200.68 |

OTHER PUBLICATIONS

LAN Emulation SWG Drafting Group, "LAN Emulcation Over ATM Specification—Version 1.0", ATM Forum, pp. 1–139. (Undated prior art).
Novell Netware Network Computing Products 3.12, "Netware 3.12 Concepts", Novell Inc., U.S.A., Part No.: 100–001715–001, Juoy 1993, pp. 158–163.
Novell NetWare Network Computing Products 3.12, "TCP/IP Transport Supervisor's Guide", Novell Inc., U.S.A. Part No.: 100–001866–001, May 1993, pp. B15–B22.

* cited by examiner

Primary Examiner—Dang Ton
(74) Attorney, Agent, or Firm—McDonnell Boehnen Hulbert & Berghoff

(57) ABSTRACT

A method manages transfer of multiple destination packets received at edge devices on a connection oriented network, such as ATM providing LAN emulation, where the connection oriented network provides emulation of one or more variant network protocols for systems coupled to the edge devices. The method includes maintaining status information for each port on edge devices on the connection oriented network, which provides an indication of network protocols not in use by systems accessible through the respective ports. Multiple destination packets received at an incoming port on an edge device are sent via the connection oriented network to a server on the connection oriented network. At the server, the network protocol for which the multiple destination packet is intended is determined. The server transmits via the connection oriented network the multiple destination packet to ports of edge devices, other than the incoming port, and other than ports for which the status information indicates that the determined network protocol is not in use by systems accessible through the port. The status information is learned at the edge devices based on activity on the respective ports, and reported by the edge device to the server.

9 Claims, 3 Drawing Sheets

PROTOCOL FOR OPTIMIZED MULTICAST SERVICES FOR A CONNECTION ORIENTED NETWORK PROVIDING LAN EMULATION

This application is a continuation of application Ser. No. 08/502,871, filed Jul. 14, 1995, by inventor Jeffrey J. Krause, entitled "Protocol For Optimized Multi-Cast Services For A connection Oriented Network Providing LAN Emulation" now U.S. Pat. No. 6,005,864.

BACKGROUND OF THE INVENTION

1. Field of the Invention

The present invention relates to protocols for interconnecting networks using connection oriented protocols, such as asynchronous transfer mode (ATM), with networks using connectionless protocols, such as Ethernet or Token Ring; and more particularly to improving performance of such systems for multicast and broadcast messages.

2. Description of Related Art

ATM is an emerging network standard based on a connection oriented network protocol. In order to transmit data between users of the ATM network, a connection is first set up between the users, and then a point to point transmission of the data is accomplished from the source through an ATM switch to the destination. When ATM switches are used to provide data connectivity for personal computers and other network devices, a number of problems occur when running networking software such as Novell IPX, TCP/IP or Xerox XNS protocols existing on the installed network PCs and servers. These network layer protocols are designed to run on a connectionless type local area network, such as Ethernet, Token Ring, or FDDI networks where the packets are placed on the network fabric and heard by all other end stations on the LAN. To provide connectivity among these network types, vendors of ATM equipment have agreed upon a set of conventions and standards called LAN emulation. A standards body which manages the ATM specification, called ATM Forum, has published a document entitled *LAN Emulation Over ATM Specification—Version 1.0*, which is incorporated by reference herein.

One primary problem that LAN emulation addresses is that most network software, based on network layer protocols, such as Netware IPX, Xerox XNS, TCP/IP, AppleTalk, and OSI, uses an end to end path, medium access control (MAC) address identification technique based on broadcast or multicast packets. When an end station A wants to communicate with another end station B, the first end station A issues a multicast packet to the network which is heard by all other end stations in the same multicast domain. Based on some higher layer information in the packet, such as user name or server name, the end station B recognizes that it is the one that should respond and does so with a unicast packet to the original end station A. This works effectively in Ethernet, Token Ring, and FDDI networks, where packets are placed on a network fabric and are heard by all other end stations. This is analogous to a person, Sarah, in an open room fill of other people yelling out "This is Sarah, is Joe here?", and having Joe hear that call and answer back, "Yes, Sarah, I'm here." Then the conversation can occur between the two at that point.

However, an ATM environment does not work in the same fashion. In this environment, packets are sent only to a single destination at the MAC layer. No other device in the network has access to the data except the recipient. The originator of the data packet, end station A, must know the ATM path address of the recipient end station B, prior to sending the packet. This is analogous to a person, Sarah, being in a closed room with a phone and wanting to talk to Joe. Sarah must know Joe's phone number and dial it to talk to Joe. The problem with this connection oriented method is that in most existing network environments, the installed end stations are running software which is not capable of knowing the address in advance of each other end station it might want to communicate with. The LAN emulation standard published by the ATM Forum addresses this problem by providing a higher layer set of services that emulate the behavior of a shared medium local area network, such as Ethernet. These services include a LAN emulation configuration server (LECS), a LAN emulation server (LES), and a broadcast and unknown server (BUS). The LECS contains a list of all the ports on the edge devices (network intermediate system devices that connect end systems or non-ATM intermediate system devices to the ATM network fabric) on the network. For each port on each edge device, the LECS identifies the multicast domain (also referred to as a virtual LAN), of which devices connected to that port are members. In addition, it identifies the LES and BUS servers that might be used for each port on the edge device. When an edge device is initialized or reset, it queries the LECS for this information.

The LAN emulation server LES is used by the edge device connecting a particular end station to the ATM network. When it is initialized, the edge device queries the LECS to find out which LES to connect to, and then whenever it gets a unicast packet from the end station, the edge device queries the LES to find out the ATM path address of the destination in the system. That address is then used to route the packet through the ATM switches.

The broadcast and unknown server BUS is used when an edge device receives a broadcast or a multicast packet from an end station, or when it receives a packet with a destination address that is not identified by the LES. When such a packet is received, the edge device sends the packet to the BUS. The BUS then identifies all other end stations which are configured as part of the same multicast domain, and sends the packet to all end systems that are part of the same multicast domain. Using the same analogy as above, Sarah calls BUS, saying she wants to talk to Joe in Santa Clara. Calif., and then BUS dials every phone number in Santa Clara leaving a message that Sarah wants to talk to Joe and leaving her phone number. Joe, along with everyone else, gets the message. and then calls Sarah back and has a conversation with her.

The approach to broadcast and multicast messages adopted by the LAN emulation standard for ATM helps in forwarding multicast messages to all stations, and relies upon filtering at the end stations as is done in existing LANs. However, a relatively large number of end stations do not need to receive the broadcast or multicast messages. Particularly, some end stations within a single multicast domain may not be using the same network level software, which generated the multicast message. Thus, it is desirable to provide a service which can intercept these messages, and forward them directly to their destination, instead of broadcasting them to every station.

SUMMARY OF THE INVENTION

The present invention provides an enhanced BUS server in the ATM architecture, which works by learning network layer protocol information and tying that information to MAC layer address tables to avoid sending multicast and broadcast packets to end systems that do not have the protocol software appropriate to respond to the packet. According to the present invention, the system configures protocol information about every end system attached to the network, and filters packets based on this information at the BUS server level.

Thus, the present invention can be characterized as a method for managing transfer of multiple destination packets received at edge devices on a connection oriented network, where the connection oriented network provides emulation of one or more variant network protocols for systems coupled to the edge devices. The method includes in one example maintaining status information for each port on edge devices on the connection oriented network, which provides an indication of network protocols not in use by systems accessible through the respective ports. Multiple destination packets received at an incoming port on an edge device are sent. if the control engine is not local to the edge device, via the connection oriented network to a server on the connection oriented network or to a server through one of its ports. The server determines the network protocol for which the multiple destination packet is intended. The server transmits via the connection oriented network the multiple destination packet to ports of edge devices, other than the incoming port, and other than ports for which the status information indicates that the determined network protocol is not in use by systems accessible through the port.

The status information according to one aspect is learned by monitoring activity at the edge devices on the respective ports; and if the server is apart from the edge device, then the activity is reported by the edge device to the server. One approach according to the present invention for generating status information for the particular ports on the edge devices includes assigning at the edge devices one of a plurality of states for each of a predetermined set of protocols for each port on the edge device, in response to traffic using the protocols in the set on the respective ports. The states include a first state indicating that the respective protocol may be in use at the port, a second state indicating that the respective protocol has not been recently used at the port, and a third, transitional state entered on occasion from the first state, during which a timer is run to determine whether the respective protocol is active on the particular port.

According this paradigm, the third state is entered from the first state occasionally, either after a time out interval, or periodically, such as once a week. The second state is entered from the third state when a time out interval expires between actions on the port involving the respective protocol, and the first state is entered from the third state if an action involving the respective protocol occurs on the port before expiration of the second time out interval. This state information is sent to the server by forwarding status updates to the server when the state for a particular port changes from the third state to the second state. or when the state for a particular port changes from the second state to the first state.

According to yet another aspect of the invention, the status information is stored in the sever, in a table indexed by a protocol identifier. When a multicast packet is sent from the edge device to the server, a protocol identifier is carried to the server. The server determines the protocol identifier, and accesses the status information using the protocol identifier as an index.

According to yet another aspect of the invention, there are a plurality of emulated networks within the system using one or more network protocols. The status information for the respective ports stored in the server includes an indication associating an emulated network with the respective ports. The process according to this aspect of the invention includes determining the emulated network for which the multiple destination packet is intended, and transmitting the multiple destination packet only to ports associated with a determined emulated network.

Accordingly, the present invention provides a technique for limiting needless broadcasting of multiple destination packets in a connection oriented network, such as ATM, providing LAN emulation. In heterogeneous network protocol environments, the present invention significantly improves network utilization by limiting multicast traffic across the ATM backbone only to members of a virtual LAN that are using the protocol specified in the multicast and not to those that are not using the protocol.

Other aspects and advantages of the present invention can be seen upon review of the figures, the detailed description, and the claims which follow.

DETAILED DESCRIPTION

A detailed description of preferred embodiments of the present invention is provided with reference to FIGS. 1 through 4. There are several techniques that can be used to configure a broadcast and unknown server in an ATM system, with required protocol information according to the present invention. The preferred embodiment described below is optimized for minimizing customer expertise and time for configuration. Alternative methods could be used based on manual configuration of the tables by a network management specialist. Alternatively, end systems could be polled to determine a configuration using standard PING protocols for IP, IPX, XNS, 3Com adapter management protocol (AMP) and other network protocols.

Figure 1:
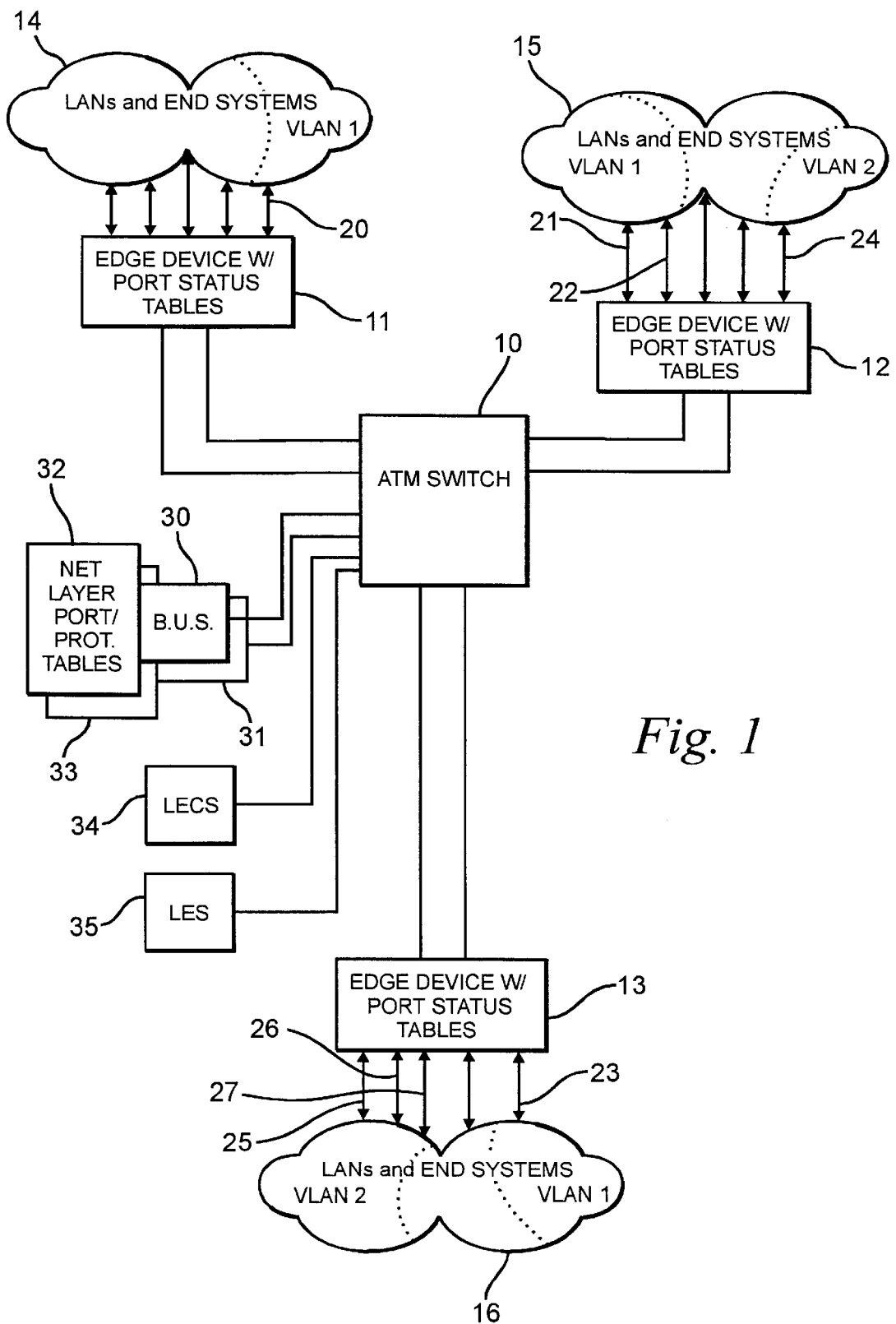
FIG. 1 is a block diagram of a ATM network with LAN emulation. which includes management of multiple destination packets for a heterogeneous network environment according to the present invention.

The environment of the present invention is illustrated in FIG. 1, which is based on an ATM switch 10 or other connection oriented network system. The ATM switch is coupled to a plurality of edge devices, including edge devices 11, 12, and 13. Each edge device includes a plurality of ports that are coupled to LANs and end systems represented by the clouds 14, 15, and 16 respectively.

In FIG. 1, two virtual LANs, VLAN 1 and VLAN 2, are illustrated. VLAN 1 includes members coupled to edge device 11 at port 20, members coupled to edge device 12 at ports 21 and 22, and members coupled to edge device 13 at port 23. The second virtual LAN, VLAN 2, includes members coupled to edge device 12 at port 24, and members coupled to edge device 13 at ports 25, 26, and 27. Within each virtual LAN, a heterogeneous protocol environment is established. Thus. VLAN 1 may include minicomputers using the XNS or TCP/IP network layer protocols over Ethernet. Also it may include Macintosh computers using TCP/IP and AppleTalk, PCs using the IP protocol, servers using IPX or AppleTalk, and servers using LAN manager, TCP/IP, NETBEUI or NBP. This heterogeneous environment within a given virtual LAN results in a number of multicast and broadcast packets which are communicated among the users of a single network layer protocol, but are not needed by systems that do not execute that protocol.

To execute LAN emulation according to the ATM standards, the ATM switch is also connected to one or more broadcast and unknown servers BUS, such as BUS 30 and BUS 31. In addition, a LAN emulation configuration server LECS 34 is coupled to the ATM switch 10, and a LAN emulation server LES 35 is coupled to the ATM switch. According to the present invention, the BUS servers 30 and 31. include network layer port/protocol tables 32 and 33 respectively, which maintain status information on a per port basis, indicating whether ports have systems accessible through them using specific protocols.

In support of these status tables coupled with the servers 30 and 31, each edge device in the system of FIG. 1 maintains port status tables, for individual protocols. These port status tables are maintained using a learning algorithm as mentioned above, which reports port by port status on a protocol by protocol basis to the servers 30 and 31 for maintenance of the status information at the central location.

Figure 2:
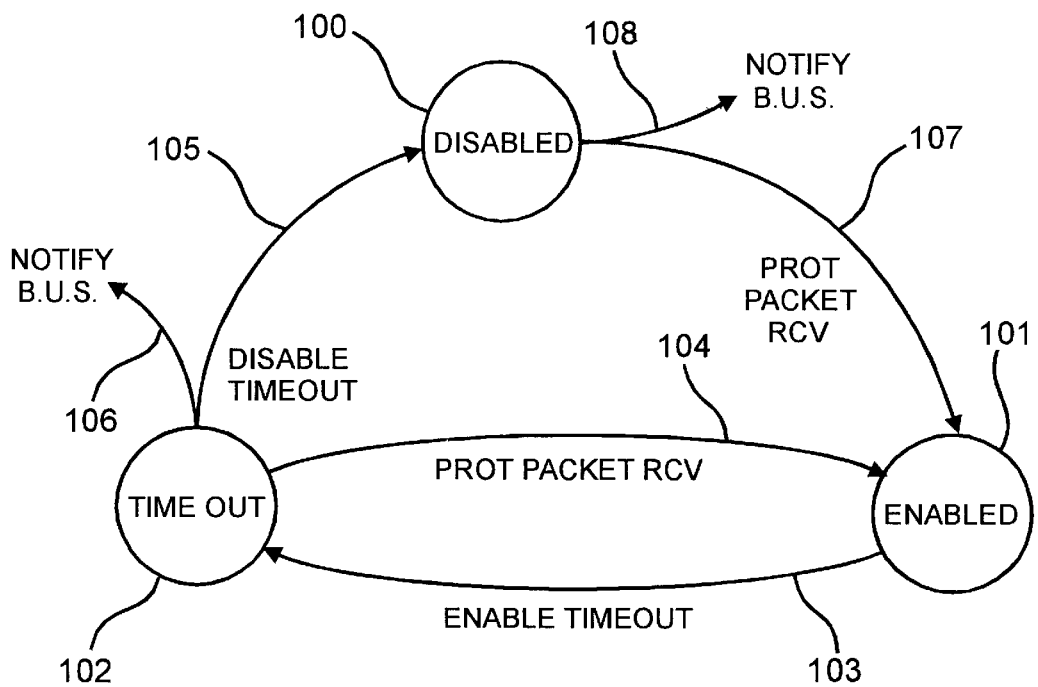
FIG. 2 is a state diagram illustrating the status learning technology according to the present invention.

FIG. 2 illustrates a state diagram for software executed for each protocol within a predetermined set of protocols. at each port on a given edge device. This software executed in the edge device is designed to operate transparently, not requiring manual configuration by the network management staff where the equipment is installed. The protocol information is collected on a per port basis at every edge device. Each edge device examines incoming packets that are received on each port, and uses the protocol ID field (typically 8 bits) in the end system packet to index into a 256 entry table that contains state information for a predetermined set of protocol entries on each port. Thus each port will have associated with it a table consisting of a range of bytes. rgbProtocolUsageTable(0 . . . 255). Each byte in the protocol usage table has a three possible values corresponding to a particular state of usage for the protocol on the port. The values include the following:

bStatusDisabled=0
bStatusEnabled=1
bStatusTimeout=2.

FIG. 2 provides a state diagram for each protocol on each port using the three states indicated. Thus, as shown in FIG. 2, each protocol for each port resides in a disabled state 100 (bStatusDisabled), an enabled state 101 (bStatusEnabled), or a timeout state 102 (bStatusTimeout). Each port is initialized in the enabled state 101, assuming that the protocol is in use by systems at the port. Periodically, such as once a week, software on the edge device changes all the protocols on a given port from the enabled state 101 to the timeout state 102 as indicated by arrow 103. The port/protocol will remain in the timeout state 102 for an interval such as one week, monitoring the port for activity relevant to the particular protocol. If a protocol packet is received, then the state for the protocol on the port transitions across arrow 104 back to the enabled state 101. If no protocol packet is received, and the time out interval expires, then the state transitions across arrow 105 to the disabled state 100. In addition, as indicated by arrow 106, a report is issued to the BUS server to update the status information.

Figure 3:
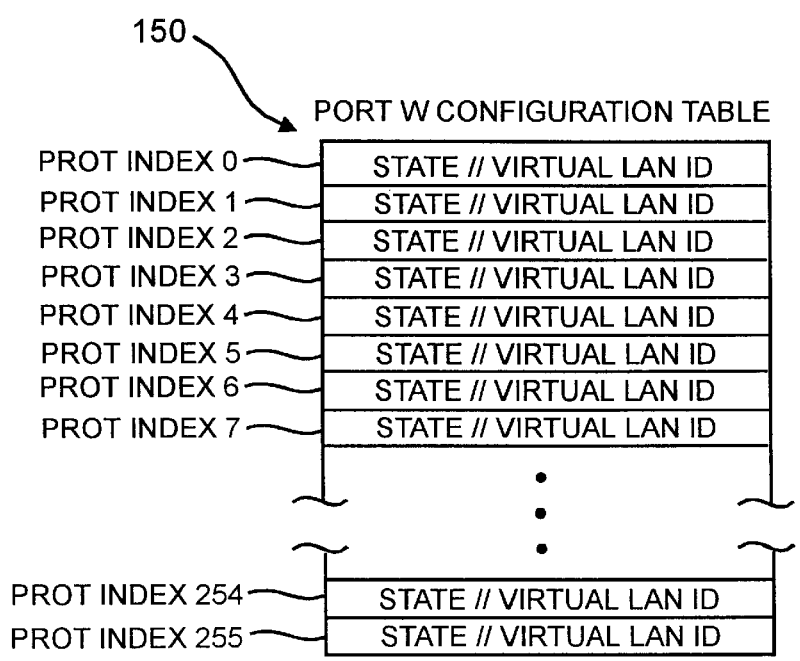
FIG. 3 illustrates the port configuration table stored in the broadcast and unknown server according to the present invention.

From the disabled state 100, the status will transition to the enabled state 101 across arrow 107 in the event that a packet relevant to the protocol is received on the disabled port. Also, as indicated by arrow 108, the BUS server is notified and the status information updated at the server. The change packet has a data structure with several fields defined as follows:

ConfigInfo.bProtocol=protocol ID from End System data packet (also the index of rgbProtocolUsageTable)
ConfigInfo.wPort=port number in Edge Device
ConfigInfo.fEnabled=TRUE The change packet issued as indicated by line 106 on a transition from the timeout state 102 to the disabled state 100 has the following format:

ConfigInfo.bProtocol=protocol ID from End System data packet (also the index of rgbProtocolUsageTable)
ConfigInfo.wPort=port number in Edge Device
ConfigInfo.fEnabled=FALSE FIG. 3 is a diagram of a configuration table for a particular port, port W, in the BUS server which is maintained according to the state information provided from the edge devices. Thus, for a given port, e.g. port W, a configuration table 150 is maintained at the BUS server. The configuration table 150 has a plurality of entries which are indexed according to a protocol identifier. Thus, as shown in the figure, there are 256 entries indexed according to a protocol index 0 through protocol index 255. Each entry includes a state for enabling or disabling the protocol at the port, and a virtual LAN identifier. According to the embodiment described with reference to FIG. 2, the state information for each protocol index is true or false. Upon initialization, the configuration table for each port is initialized so that all entries are set to the true state. The virtual LAN ID indicates whether systems within a particular virtual LAN are accessible through a port. The virtual LAN ID field is initialized by manual configuration or other techniques.

If the BUS server receives a message from an edge device that a protocol configuration has changed for one of the ports, then the server updates the appropriate entry in the array according to the following formula, where w is the index to the set of configuration tables based on a particular port, and the configuration table 150 is accessed by the protocol identifier.

w=Edge Device Base port number+ConfigInfo.wPort
rgPortInfo(w).rgfProtocol(ConfigInfo.bProtocol)= configInfo.FEnabled Thus, the entry in the configuration table for port w is updated in response to the ConfigInfo.fEnabled flag in the change packet.

Figure 4:
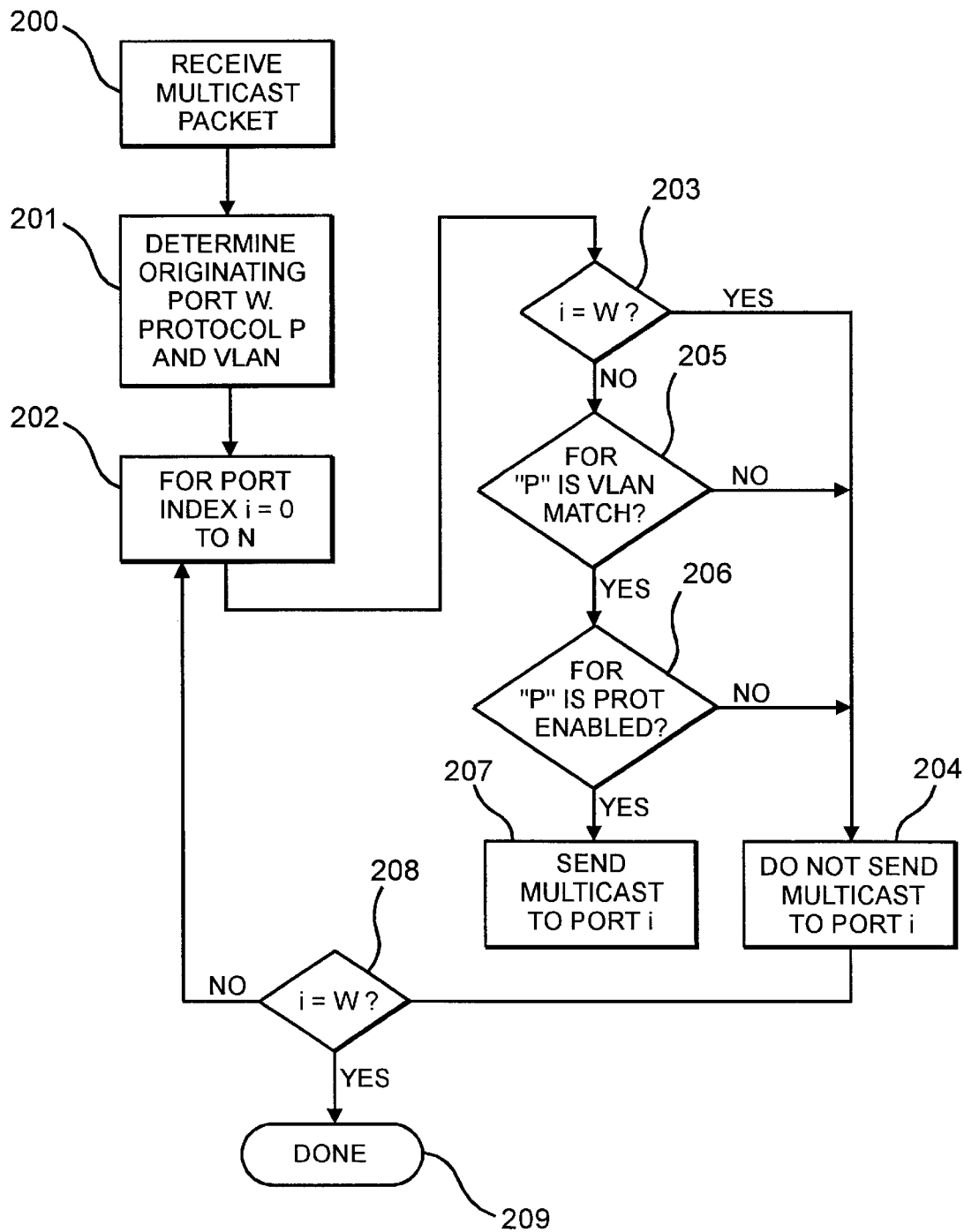
FIG. 4 is a flow chart describing the process for forwarding multiple destination packets according to the present invention.

When a packet is received by the BUS server to be repeated to all members of the multicast domain or virtual LAN, the BUS server executes an algorithm to decide for each member of the multicast domain if the packet needs to be sent or not. One method for doing this is illustrated in FIG. 4. The process begins when an edge device receives a multicast packet. First the edge device forwards the packet to the BUS server with an attached header that contains the port number of the edge device that the packet was received from:

MultiCastInfo.wPort port=number

This packet is received by the BUS and processed as follows:

wPort=Edge Device Base Port number+ MultiCastInfo.wPort
bProtocol=protocol ID byte from data packet
wLan=rgPortInfo.wVirtualLanId FOR i=0 to iPortInfo- Max IF i≠wPort AND
   (* don't send packet to same port on edge device *)
  rgPortlnfo(i).wVirtualLanId=wLan AND
   (* same multicast domain *)
  rgPortlnfo(i).rgfProtocol(bProtocol)=TRUE
   (* protocol enabled for this device *)
    THEN Send Packet to port on edge device specified by index i Thus, the edge device receives the multicast packet as indicated at block 200 of FIG. 4. The first step involves determining the originating port "W", protocol "p" and virtual LAN of the multicast packet (block 201). The algorithm then executes a loop for each port over index i, equal to port number 0 through port number N (block 202). For a given port number i, the algorithm determines whether the port i in the table equals to the port w from which the incoming multicast packet was received (block 203). If it was the incoming port, then the algorithm branches to block 204 and does not send the multicast packet to port i. If it is not the incoming port, then the algorithm determines whether the virtual LANs match (block 205). If it does not match, then the algorithm branches to block 204 and does not send the multicast packet. If the virtual LAN does match at block 205, then the algorithm determines whether the protocol is enabled for the particular protocol P (206). If it is not enabled, then the multicast packet is not sent to port i as indicated at block 204. Steps 205 and 206 can be done with a single access to the status table shown in FIG. 3 for port i, using the protocol identifier as an index to the table. If the protocol is enabled at block 206, then the multicast packet is sent to port i as indicated at block 207. After blocks 204 and 207, the algorithm determines whether the index i is equal to N (block 208). If not, then the algorithm loops back to block 202 to continue the loop. If i is equal to N, then all of the ports registered in the BUS server have been tested, and the algorithm is done as indicated at block 209.

Thus. the present invention maintains a table which is indexed by the protocol identifier "bProtocol" which is carried by the attached header of the multicast packet. Each of the configuration tables for all of the ports registered in the BUS device is accessed using this index to immediately determine whether the protocol is enabled for the particular port, and whether the virtual LAN carried by the header matches with the virtual LAN for which the port is configured in the BUS server.

Accordingly, a system for improving the network performance when operating in a LAN emulation environment using asynchronous transfer mode ATM switches has been provided. The BUS server dynamically learns the network protocol information about each personal computer, network file server, or host using the ports of the ATM edge devices. The BUS server then repeats multicast or broadcast messages but only to members of a virtual LAN that are using the protocol identified and not to those that are not using the protocol. The configuration can be manually set up by network administrators. Also, the present invention provides a technique for automatically configuring the system. The automatic configuration approach assumes that all protocols are in use, and only disables protocols after a significant of time has passed at a particular port in which no use of that protocol has been encountered. This ensures a robust automatically configured system for managing multiple destination packets in a connection oriented network that provides emulation services for connectionless networks.

Although the preferred embodiment described above distributes the learning, monitoring, filtering and transmitting functions between the edge devices and the improved BUS server in a manner which efficiently utilizes standard resources in the ATM LAN emulation environment, other configurations of resources could be used. For example, the status table could be maintained in one or more edge devices, or even in an end system on a LAN connected to the edge device. In these examples, multidestination packets received at the edge device would be processed locally. or sent to the end system executing the server functions across a LAN segment.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. In a connection oriented network which provides emulation of one or more variant network protocols for systems coupled to ports of edge devices on the connection oriented network, a method for managing transfer of multiple destination packets received at incoming ports on the edge devices on the connection oriented network, comprising:
   determining, at a BUS server level, a network protocol for which a multiple destination packet is intended;
   transmitting via the connection oriented network the multiple destination packet to ports of the edge devices other than an incoming port and other than ports for which the determined network protocol is not in use; and
   assigning one of a plurality of states for each of a set of network protocols for each port on the edge devices in response to traffic using network protocols in the set on the ports, the plurality of states including a first state indicating that a respective network protocol may be in use at a port, and a second state indicating that the respective network protocol has not been recently in use at the port.

2. The method of claim 1, wherein the plurality of states further includes a third state indicating that state information may be stale for the respective protocol on the port.

3. The method of claim 2, wherein the third state is entered on occasion from the first state, and wherein the second state is entered from the third state when a first timeout interval expires between actions on the port involving the respective network protocol, and wherein the first state is entered from the third state if an action involving the respective network protocol occurs on the respective port before expiration of a second timeout interval.

4. The method of claim 1, further comprising:
   storing, in a status table, the plurality of states for the ports on the edge devices on the connection oriented network.

5. The method of claim 3, further comprising:
   storing, in a status table, the plurality of states for the ports on the edge devices on the connection oriented network.

6. The method of claim 4, further comprising:
   updating the status table when the state changes from the third state to the second state and when the state changes from the second state to the first state.

7. The method of claim 5, further comprising:
   updating the status table when the state changes from the third state to the second state and when the state changes from the second state to the first state.

8. The method of claim 4, further comprising:
indexing the status table based on protocol identifiers.

9. The method of claim 5, further comprising:
indexing the status table based on protocol identifiers.

* * * * *